United States Patent [19]
Fiedrich

[11] Patent Number: 5,579,996
[45] Date of Patent: Dec. 3, 1996

[54] RADIANT FLOOR AND WALL HYDRONIC HEATING SYSTEMS

[76] Inventor: Joachim Fiedrich, 20 Red Pine Dr., Carlisle, Mass. 01741

[21] Appl. No.: 207,950

[22] Filed: Mar. 8, 1994

Related U.S. Application Data

[63] Continuation of Ser. No. 906,800, Jun. 30, 1992, Pat. No. 5,292,065.

[51] Int. Cl.$^6$ ........................................ F24D 19/02
[52] U.S. Cl. .................. 237/69; 237/56; 165/45
[58] Field of Search ................ 237/69; 165/45, 165/46, 49

[56] References Cited

FOREIGN PATENT DOCUMENTS

| 61134527 | 12/1984 | Japan | ........................... 237/69 |
| 134527 | 6/1986 | Japan | ........................... 237/69 |

Primary Examiner—Henry A. Bennett
Assistant Examiner—Siddharth Ohri
Attorney, Agent, or Firm—Robert T. Dunn, Esq

[57] ABSTRACT

A hydronic heating system that has a boiler supplying hot supply water, a reservoir of cooler return water, a supply water line, a return water line and one or more heating loops through which water flows from the supply line to the return line, the heating loop including a heating element that is a length of tubing that conducts water from the supply to the return and is mounted in a wall or a floor of an area heated by said system by RFH or RWH has: a thermally conductive plate mounted in the area floor or wall, adjacent a surface thereof and a space defined at least in part by said plate, in which the length of tubing is held and a compliant filler material fills the space between the tubing and the plate, so that the tubing is held in the space in intimate thermal contact with the plate, so that the plate is heated by conduction of heat from the tubing and the plate has a radiating surface that radiates heat to the area. The plate with slot is provided as a modular piece and several such modular pieces are arranges in line attached to the sub-flooring for RFH, or the wall studs for RWH, for insertion of the length of tubing in the aligned slots thereof; and following such insertion, the installation is ready for a finishing floor or wall covering. Thus, RFH or RWH is installed "dry" (without wet concrete, cement or plasted) and can be accessed later by removing the finishing cover.

16 Claims, 6 Drawing Sheets

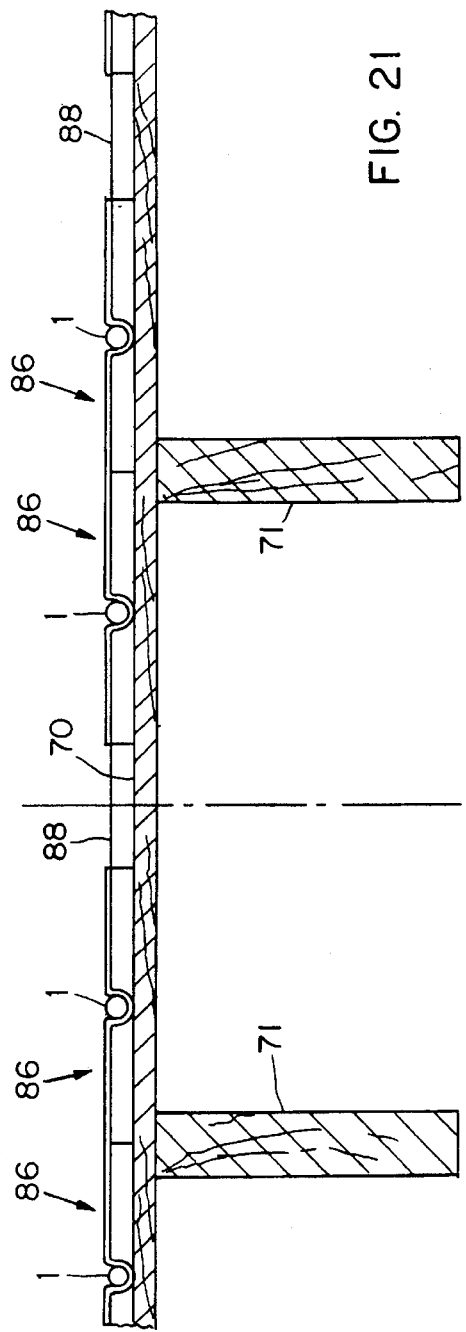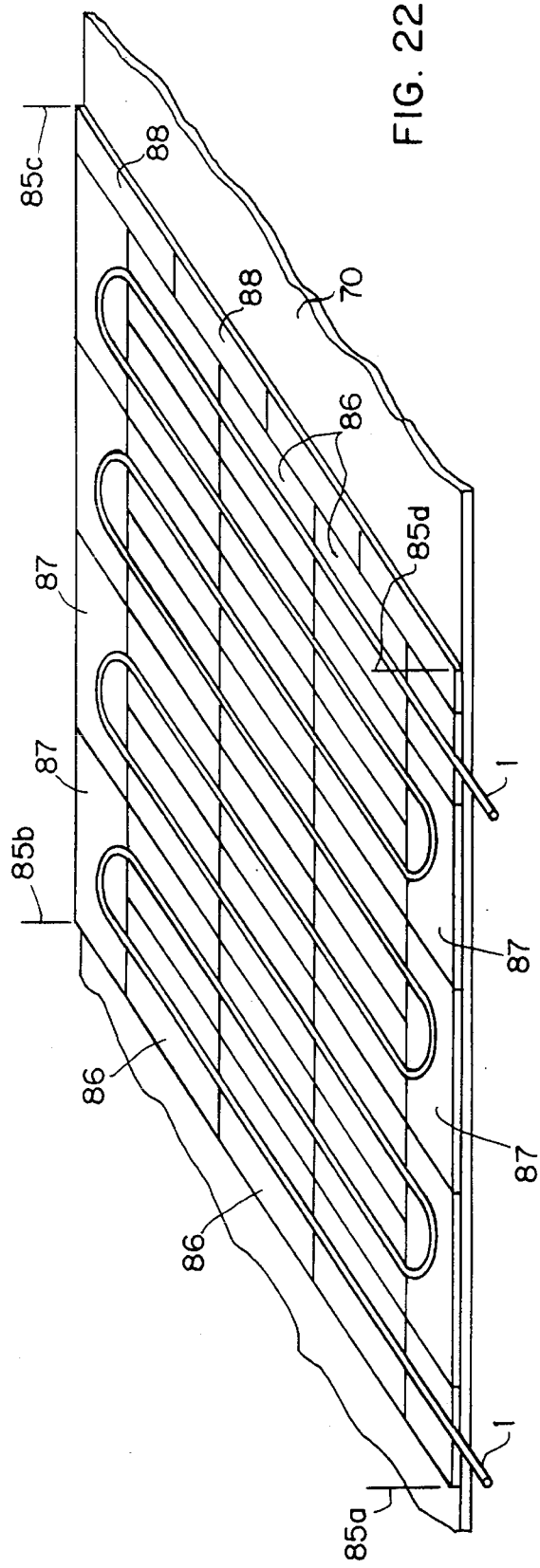

RADIANT FLOOR AND WALL HYDRONIC HEATING SYSTEMS

This application is a continuation of application Ser. No. 07/906,800, filed Jun. 30, 1992, now U.S. Pat. No. 5,292,065.

BACKGROUND OF THE INVENTION

This invention relates to hydronic heating systems for dwellings, offices, etc. and more particularly to such hydronic heating systems having heating loops that consist of tubing or pipes attached to modular radiating panels in the floor or walls of a room that heat the and method and means of securing the tubing to the panels.

RADIANT FLOOR AND WALL HYDRONIC HEATING

Radiant floor heating (RFH) and radiant wall heating (RWH) are techniques of heating rooms in a dwelling or commercial building for human and creature comfort. It is believed by many that radiant heating is the ideal way to warm the human body. Europeans have revitalized a modern form of hydronic radiant floor heating in the last few decades after it had been out of use since the Romans first used warm air floor heating systems in their villas two thousand years ago.

Radiant heating warms the surfaces of a room: the floor, the walls, the furniture, which become heat sinks, slowly giving off their warmth to the cooler surroundings. People and creatures in the room then absorb this heat as needed. It can be compared to walking barefoot on warm earth that has been heated by the rays of the sun when surrounding air temperature is cool, however, as long as there is no breeze, one feels comfortably warm. Furthermore, in a radiant heating system, the warm temperatures are kept at floor level and radiate up wards; and, since there is no circulating air, there is not a hot pocket of air formed at the ceiling level. With radiant floor heating, one actually experiences cooler temperatures at head level and warmer temperatures at foot level which results in comfort and warmth.

In most western European countries, especially Germany and Scandanavia, hydronic radiant heating is the most popular technique of heating, not only residential dwellings, but also commercial buildings.

Heating comfort is not the only advantage of hydronic radiant floor heating and these other advantages help to make the choice even more sensible. Some of the other advantages of hydronic RFH and RWH are:

1. Reduced heat loss of 20% to 50%, depending on the application;
2. Suitable for all types of hydronic heat sources from high temperature boilers to low temperature heat pumps and solar water heaters, since most of these systems will operate at loop supply water temperatures of 120° F. or less;
3. Ideal for hard to heat areas, especially high and voluminous spaces and large glassed-in living areas;
4. No air movement within the building is caused by the system and so there are no recessed areas where dirt and dust can be trapped, thereby eliminating some dust and allergy problems;
5. No visible radiation units, thereby eliminating the need to work around heating elements, and so wall space is not limited by heating elements; and
6. Completely quiet and free of circulation and expansion and contraction noises, making the system noiseless.

In the past, tubing materials, control devices and proper installation techniques had not been perfected and so radiant heating was not used. However, the present reliability of controls, special installation techniques, and, particularly the development of very strong flexible plastic tubing, called PEX tubing, with its two decade record of successful installations embedded in cement floors, eliminates many causes for concern.

High efficiency oil and gas fired boilers reach seasonal efficiency levels of over 80% for conventional oil and gas boilers and over 90% for condensing gas boilers. Every additional percentage point to be gained by bringing flue gas temperatures into the condensing stage results in more equipment and maintenance costs. Therefore, in the hydronic heating system, there is a potential for fuel reduction in residential and commercial buildings not only for new installations, but also for existing systems. Such improvements can be accomplished using existing technology and available equipment and applying cost effective installation methods that afford short pay back periods. The most desireable benefits of this are increased heating comfort as well as significant fuel reduction. Some of the existing technologies that can be used to accomplish these improvements are:

1. Operate with continous circulation rather than intermittent circulation by using state of the art weather responsive indoor/outdoor reset controls and mixing valves; thus separating the radiation system from the boiler system for greater heating comfort and fuel reduction of 10% to 35%.
2. Use large heat radiation surfaces in all the heated spaces, because the larger the heat emmission surfaces, the lower the heating medium temperature. This results in greater radiant heat output and less convection heat output and avoids using large surface steel, cast iron, or aluminum radiator panels. For every 3° F. reduction of seasonal mean supply water temperature, there is approximately 1% fuel reduction. In addition, the lower the radiation surface temperature, the higher is the level of human health comfort, because there is less convective air movement.
3. An RFH space allows a reduction of 3° F. to 4° F. in ambient air temperature to be maintained without any loss of heating comfort and avoids heat stratification in ceiling areas and heat loss through the roof.
4. Hydronic heating permits domestic hot water (DHW) production using a large efficient heat exchanger for producing and storing DHW, called an indirect fired DHW tank.
5. Time-cycling and outdoor reset controls are well developed and available.

Floor heating and snow melting installation techniques of hydronic heating systems for heating the rooms in a dwelling or commercial building are used widely in Europe and to a lesser extent in the United States. In these systems, water heated in a boiler is distributed to heating loops of tubing in the dwelling that carry the heat by radiation, conduction and convection to the rooms in the dwelling. A common technique provides a boiler hot water supply feeding the supply header of the heating loops and the boiler water return to which the return header of the heating loops connects. The return water is heated in the boiler and sent out again as hot supply water, and so the water is cycled through the essentially closed system. One or more water pumps in this system keep the water flowing and valves control water flow rates through the loops depending on demand.

A heating loop may include several heating elements like wall mounted radiators and/or baseboard finned tubing that are the principal heat exchangers of the loop, or the tubing itself may be the principal heat exchanger of the loop. In the latter case the tubing is usually buried in a layer of concrete that forms the floor of a room and so the tubing heats the concrete slab, which is the floor. The concrete that the tubing is buried in is a special kind for the purpose and the heat exchange is principally by conduction and radiation to the concrete, which in turn heats the room by some conduction and convection, but principally by radiation. Hence, this type of heating is called Radiant Floor Heating (RFH). Similarly, the tubing is sometimes mounted in a wall embedded in a layer of concrete and this is called Radiant Wall Heating (RWH).

PLASTIC TUBING HEATING LOOP

In such RFH and RWA systems and other hydronic heating systems using wall radiators and/or baseboard finned tubing elements, the supply water temperature from the boiler must be controlled so that it does not exceed certain limits that are substantially lower than the usual boiler supply water temperature. There are several reasons for this: the floor or wall must not be uncomfortable hot; and where the tubing is plastic, the water temperature for some plastic materials must not exceed about 140° F., although good quality "cross-linked" polyethylene tubing can carry water at temperature in excess of 140° F. without any deterioration of the tubing or the tubing oxygen barrier.

The design criteria of plastic tubing for RFH and RWH system applications is determined by a number of important factors to insure an absolutely safe and reliable tubing. The most important design criteria requirements are:

1. High resistance to temperature aging for water temperatures up to 200° F.
2. High resistance to stress cracking.
3. High resistance to chemical solvents (water additives, antifreeze solutions, concrete additives).
4. Lowest possible linear thermal expansion.
5. High tensile strength.
6. High form stability.
7. High resistance to abrasion.
8. High resistance to deformation.
9. Dimensional tube tolerances.
9. Internal and external tube wall smoothness.
10. Behavior during long term internal pressure creep test which takes into account the temperature-dependent aging behavior of the pipe material at water temperatures up to 200° F.

Many of these requirements are dictated by the usual practice of embedding the tubing in a layer of concrete. They are design criteria that are outlined and specified in the ASTM standards (American Society for Testing and Materials), and DIN (German Industry Standards). Many, if not all of these design requirements be achieved while still retaining a flexible and workable plastic tubing (pipe) as an end product. That tubing is called PEX, which is short for "Polyethelene Cross-Linked". PEX has been synonymous with plastic heating pipe in many European countries for several decades and has a track record that has made it the plastic tubing of choice for hydronic heating applications.

Long term bench tests, which simulate 30 years of continuous use, in addition to accelerated testing which projects pipe performance well in excess of 30 years has confirmed the excellent long term real service life track record of PEX. Crossed-linked polyethylene tubing is now, after 20 years of use and improvements, the most widely accepted pipe material in the European plumbing industry for both heating and plumbing applications.

Plastic Tubing and Cross-Linking

The molecules of any plastic material tend to slip and slide over one another fairly freely. As ambient and water temperatures rise, the plastic material softens and finally melts. This thermal oxidation of plastic material is a long term aging process which will eventually result in pipe failure.

To combat this premature aging the molecules within the tubing are realigned in order to give greater stability to the material itself. The cross linking process takes place within the molecular structure of the plastic material. The most common thermoplastic materials currently being used for heating and plumbing pipe, often referred to as polyolefin materials are: Polyethylene (PE); Polypropylene (PP); and Polybuten (PB)(generic term for polybutylene). Among this family of polyolefin plastics, only Polyethylene has been determined to have the molecular structure which lends itself perfectly to the cross linking process.

"Un-cross-linked" polyethylene tubing, as it leaves the extruder where it receives its basic pipe dimension and wall thickness, is composed of long hydro-carbon string molecules forming a loosely held together array of hydrogen and carbon atoms which can be compared to a beaded curtain swaying in a breeze. This is basically the molecular composition of the polyethylene tubing which is available at any hardware store and is suitable only for non-critical applications such as draining condensation from an air conditioning unit or syphoning gasoline from from a. A material, in this form, is unsuitable for heating and plumbing applications. Within a relatively short period of time the pipe material fatigues under the stress of water temperature and pressure as well as temperature cycling and the beaded curtain would splits open without resistance. By cross-linking those beads (hydro-carbon string molecules), forming cross-connections which are referred to as cross-linking bridges, the string molecules form a three dimensional network of hydrocarbon molecules. The beaded curtain becomes transformed into a fishing net with strength and stability.

The previously non-applicable polyethylene pipe has been transformed, after cross-linking, into a completely different material with all the desired characteristics we demand for a heating or plumbing pipe. After the cross-linking of the PE tubing, its molecular mobility is severely impeded by the cross-linking bridges between the string molecules. The material does not flow or melt and its form becomes stable against heat. The material holds its shape at all temperatures, even exposed to blow torch temperatures until it chars or burns. The thermoplastic has been transformed into a thermoset material by cross-linking, eliminating the melting point or liquid phase of the material.

Cross Linking Techniques

There are basically two types of PE raw materials in use: Low to medium density (LD or MD PE) and High density (HD PE). Low to medium density polyethylene "SOFT PE" has a multibranch string molecule shape which allows a lower to medium density formation of string molecules within the pipe material.

High density polyethylene has a linear string molecule shape with only small stumps of branches, which allows for a higher density formation of string molecules within the pipe material.

The material density affects the physical properties of the pipe material. HD PE or "HARD PE" has a higher resistance to stress cracking and chemical solvents, higher tensile strength, higher resistance to deformation and is less permeable to oxygen Chemical Cross-linking includes: Peroxide Cross-linking; Silan Cross-linking via Dow Corning Method; and AZO Cross-Linking. Three methods of Peroxide Cross-Linking are the Engel, PAM and DAOPLAST methods.

Mechanical Cross-linking is Electronic Cross-linking by a Cross-Linking High Energy Electron Beam The various chemical cross-linking methods use chemical agents which are added to the PE base resin in order to form cross-linking bridges between the PE string molecules. The only practiced mechanical cross-linking method uses no chemical agents, instead, utilizes the high energy of an electron beam accelerator to form a three dimensional cross-linking network between the PE molecules.

Among the various chemical methods only two types are commonly used for heating pipe production: The Engel and Silan method. The Engel method, named after its inventor, uses a cross-linking agent (peroxide) and heat stabilization agents which are mixed into the PE resin. The mixture is then compressed under high pressure in a "pre-molten" state and fed through the extrusion die, where the actual cross-linking process takes place. This is a "press-sintering" process which achieves pipe extrusion and molecular cross-linking during one extrusion process.

The Silan method uses a mixture of two compounds with a mixing ratio of 95 to 5 parts. One compound consists of PE-resin and cross-linking agents as well as other additives. The second compound consists of PE-resin and a catalyst. After mixing both compounds, the pipe is extruded conventionally. The cross-linking reaction is triggered after extrusion by exposing the extruded coil to moisture such as steam or water. Most other chemical methods are variations of either the Engel or Silan method.

The electronic or mechanical cross linking method does not use any chemical means to achieve cross-linking bridges between the PE-molecules. The basic PE-resin is first extruded to give the pipe the basic required dimensional shape, then coiled up and fed through a high energy electron accelerator which exposes the extruded pipe material to the enormous energy of an electron beam. The energetic electrons strike the PE-molecules at or near a carbon/hydrogen bond, releasing enough energy to the molecule to break that bond, setting the hydrongen atom free which diffuses out of the pipe in the form of hydrogen gas during the process. A large percentage of carbon atoms have then lost their hydrogen atom partner leaving the parent molecule in an excited state, able to form a new bond with another adjacent carbon atom without a hydrogen partner (called a free radical). These new carbon to carbon bonds are the desired cross-linking bridges which form a three dimensional network among the PE string molecules.

Electronic cross-linking is the oldest known method of creating PEX. Over three decade ago, U.S. Companies applied this method to manufacture primarily cable enclosures including those used for undersea cables. This method was then adopted by German manufacturers for the production of heating and plumbing pipes.

Oxygen Diffusion

A closed loop hydronic heating system will cause an oxygen poor water condition after the initial filling of the piping system. Oxygen depleted water (dead water) in an oxygen tight closed piping system is an effective and inexpensive heat transfer medium. The benefit of oxygen depleted water is its non-corrosiveness to system components, piping, valves, pumps, boilers, etc. However, this generated "oxygen vacuum" within a closed piping system causes a very high affinity in the system water for oxygen enrichment. This means that the generated oxygen vacuum in the system will absorb outside oxygen through any means possible.

In a steel or copper piping system the only source of oxygen permeation is through leaking fittings, valves, air vents, and above all, improperly sized expansion tank equipment. Copper or steel tubing itself is absolutely oxygen tight. However, that is not the case with plastic or rubber tubing. In recent years it has been discovered in Europe, after enormous corrosion and subsequent sludging problems developed in systems utilizing oxygen permeable plastic tubing in "closed systems", that plastic tubing allowed enough oxygen permeation through the pipe wall to cause corrosion in the system.

Subsequently, a special oxygen diffusion test for plastic tubing was developed to determine the amount of oxygen penetrating the tubing. The chemically bound oxygen (no visible air bubbles) in the system water entering through the pipe walls creates an extremely aggressive water condition, corroding not only ferrous materials but also copper, brass and plastics as well. The tests revealed that the rate of oxygen diffusion is directly related to the system water temperature—the higher the water temperature, the higher the rate of diffusion which is measured in milligrams per liter per day.

The German Industry standards (DIN) have determined that an oxygen diffusion rate of 0.1 mg/liter/day or less at a water temperature of 104° F. (40° C.) in plastic tubing is considered a safe level to prevent oxgen corrosion in heating system components. For comparison: The amount of 5 milligrams of oxygen per liter per day caused by oxygen diffusion through the pipe wall is equivalent to completely draining the heating system and refilling it with fresh water every other day during the heating season.

In order to eliminate the serious problems of oxygen diffusion on closed loop heating systems with plastic pipe, oxygen diffusion barriers have been developed. These barriers are usually applied to the exterior of the pipe. Each pipe manufacturer has its own method and process for applying this barrier. The main criteria for these barrier application techniques are the operating water temperatures of the intended pipe usage.

An acceptable alternative to oxygen diffusion barriers is the usage of system separation by means of stainless steel heat exchangers that separate the plastic distribution system from the heat source and mechanical components.

Oxygen diffusion is obviously no issue for plastic tubing intended for use on open hot and cold domestic hot water systems where oxygen is present at high concentrations in any case.

Low Temperature vs High Temperature Operation

The hydronic heating loop supply water temperature could be maintained low and so avoid the problem of tubing aging, by simply operating the boiler at a lower water temperature. However, that can cause flue gas condensation on the boiler water heat exchanger. For example, the flue gas due point can be as high as 140F. and so to avoid flue gas condensation it is preferred that the boiler supply water temperature be not less than 140° F.

In hydronic heating systems subject to such water temperature limitations, where the boiler is powered by burning fossil fuels, the boiler water supply temperature is usually well above 140° F. and often at about 190° F. to 200° F., and so the boiler supply temperature must be stepped down before it is fed to the heating loops.

A suitable system for reducing and controlling the supply water temperature is described in my U.S. Pat. No. 5,119,988, issued Jun. 9, 1992 entitled "Hydronic Heating Water Temperature Control System. In that patent a three-way, modulated diverting or by-pass valve is provided in the return line to the boiler, between the heating loop return header and the boiler return. The diverting valve has one input and two outputs. The input is from the heating loops return header, the first output is to the boiler return line and the second output is to the boiler supply line. The diverting valve diverts some of the cooler return water to the hot supply water to reduce the temperature of the supply water feeding the heating loop supply header. Thus, the supply water is diluted with return water, lowering the temperature of the supply water directly from the boiler. The diverting valve is a modulated valve and the temperature of the supply water flowing to the supply header is detected and used as a feedback control signal to modulate the valve.

SUMMARY OF REQUIREMENTS FOR RFH AND RWH

Thus, the boiler must be operated at a sufficiently high water temperature (over 160° F.) to avoid flue gas condensing, the supply water temperature to the heating loops must be reduced to no more than 110° F. so that the heated floor or wall is not uncomfortable to stand on or touch, the heating loop tubing must be PEX quality or better and have an oxygen barrier and the tubing must be sufficiently flexible that it can be inserted in place with ease and not require special skills and equipment to install.

Heretofore, these requirements have been met using a hydronic heating system having supply water temperature control such as described in said U.S. Pat. No. 5,119,988, or other suitable supply water temperature controls, to feed one or more heating loops of PEX tubing that is embedded in a layer of special concrete three to six inches thick that serves as the floor or wall of a room to provide RFH or RWH heat in that room.

Installation of the PEX tubing embedded in concrete requires special skills and tools and is relatively expensive. Also there must be suitable support structure as the concrete adds considerable weight. This technique of installing the tubing in wet concrete or cement is sometimes called a "wet" installation and requires special equipment and working skills to hold the tubing in place, and in the case of RFH, pour the wet concrete to cover the tubing by an inch or more and finish the concrete surface when it sets. For a wall installation, special skills are required to spread to spread a special wet cement or plaster mix over the tubing that has been attached to the wall and then finish the wall, usually with a wet white plaster mix. These "wet" installations depend upon the direct conduction of heat from the tubing into the concrete or plaster, raising the temperature of the concrete or plaster, which in turn radiates heat into the room. For such RFH and RWH installations, radiation into the room is entirely dependent upon the heat from the tubing flowing by conduction to the concrete or plaster. For such RFH installations, there is often no adequate thermal barrier under the concrete, particularly when the concrete floor is supported directly by gravel, sand or earth.

The thermal mass of the cured cement, concrete or plaster in these installations makes the response time of the hydronic heating system slow. The cement, concrete or plaster is a large heat sink and until the temperature of this mass is raised, there is no increase in heat flow into the heated area. This large thermal mass also results in overheating, because the system tends to deliver more heat than is required to meet the demand, unless the control system is sophisticated and programmed for the particular area that is heated.

The PEX oxygen barrier tubing, or its equivalent, is required for these installations to insure that the PEX tubing will not fail within the life expectancy of the building it is installed in. Inferior quality tubing fatigues under the stress of the water temperature (even water at 110° F.) and pressure and splits, like un-cross-linked polyethylene tubing and without a suitable oxygen barrier, oxygen diffusion occurs and the system components that contain the water corrode. When such failures occur, the concrete floor or wall in which the tubing is embedded must be broken up and the entire loop replaced.

Clearly, there is a need to provide hydronic RFH and RWH with all of the benefits thereof without embedding the loop tubing in concrete, cement or plaster, or the like, in new construction and in old construction.

SUMMARY OF INVENTION

It is an object of the present invention to provide a hydronic heating system in a building wherein the system heating elements include tubing in the floor and/or the walls of the building in a "dry" installation (without embedding the tubing in concrete, cement, plaster, or the like).

It is another object to provide such a system that radiates heat into the heated area more quickly than an equivalent "wet" installation.

It is another object to provide such a system wherein overheating, as occurs in an equivalent "wet" installation, is less likely to occur.

It is another object to provide such a system that is relatively less expensive than prior hydronic RFH or RWH systems of equivalent capacity and which avoids some of the limitations and disadvantages of the prior systems.

It is another object to provide such a system for which installation of the RFH or RWH tubing heating elements is relatively less expensive than for prior hydronic RFH or RWH systems of equivalent capacity and which avoids some of the limitations and disadvantages of the prior systems.

It is another object to provide such a system for which installation of the RFH tubing heating elements is on top of the rough flooring of a room.

It is another object to provide such a system for which installation of the RFH tubing heating elements is below the rough flooring of a room.

It is another object to provide such a system for which installation of the RWH tubing heating elements is over the studs of a wall in a room.

It is another object to provide such a system for which installation of the RWH tubing heating elements is between the studs of a wall in a room.

It is another object to provide such a system for which thermal conduction and radiation from the RFH or RWH tubing heating elements is increased substantially by radiating surfaces in direct thermal contact with the tubing, and forming part of the installation.

It is another object to provide such a system for which the installed RWH or RWH tubing heating elements can be reached for repair by removing no more than a "dry" finished floor or wall covering that is installed over the elements.

It is another object to provide such a system for which the RWH or RWH tubing heating elements can be installed on top of existing finished floor or wall surfaces.

It is another object to provide such a system for which the RWH or RWH tubing heating elements and installation parts thereof are the same for RFH and RWH.

It is another object to provide such a system with boiler supply water temperature control that is satisfactory to avoid feeding excessively high temperature boiler supply water to the system RWH or RWH tubing heating elements.

It is another object to provide such a system with boiler supply water temperature control that is satisfactory to avoid feeding excessively high temperature boiler supply water to the system RWH or RWH plastic tubing heating elements.

It is another object to provide such a system with boiler supply water temperature control that is satisfactory to avoid feeding excessively high temperature boiler supply water to the system heating loops and also avoid operating the boiler at a water temperature that is likely to cause flue gas condensation in the boiler.

Embodiments of the present invention have application to a hydronic heating system that has a boiler supplying hot supply water, a reservoir of cooler return water, a supply water line, a return water line and one or more heating loops through which water flows from the supply line to the return line, the heating loop including a heating element that is the length of tubing that conducts water from the supply to the return and is mounted in a wall or a floor of an area heated by said system by RFH or RWH. The invention includes a thermally conductive plate mounted in said area floor or wall, adjacent a surface thereof and means including a compliant thermally conductive filler material for holding the length of tubing in intimate thermal contact with the plate, so that the plate is heated by conduction of heat from the tubing and the plate has a radiating surface that radiates heat to the area. In the first embodiment described herein, the plate is between the tubing and the floor or wall surface and is held against the plate by holding pieces (sleepers) that hold the plate against the floor or wall and also hold the tubing against and longitudinally along the plate and in intimate thermal contact therewith by compliant thermally conductive filler material. In the second embodiment described herein, the tubing is between the plate and the floor or wall surface and there is a longitudinal slot in the plate that serves as the tubing holding means and is an integral part of the plate, so that the plate substantially "wraps" around the tubing and in intimate thermal contact therewith by compliant thermally conductive filler material; and holding pieces (sleepers) hold the plate against the floor or wall and also support and define the slot in the plate.

In preferred embodiments, the plate and the tubing holding means, including the holding pieces (sleepers) are assembled to form a modular piece or modular unit; and several such modular pieces are arranges in line attached to the sub-flooring for RFH, or the wall studs for RWH, ready for insertion of the length of tubing in the aligned holding means thereof and in intimate thermal contact with the plate by compliant thermally conductive filler material; and following such insertion, the installation is ready for a finishing floor or wall covering. Thus, RFH or RWH is installed "dry" (without wet concrete, cement or plasted) and can be accessed later by simply removing the finishing cover.

BRIEF DESCRIPTION OF THE DRAWINGS

FIG. 21 is an enlarged end view of an RFH installation on top of the rough flooring showing several modular assemblies of tubing, heat transfer plate and plate holder (modular pieces), arranged side by side on the rough flooring; and FIG. 22 is a perspective view of the floor of a room showing several of the modular assemblies of different kinds, arranged side by side and end to end on the rough flooring of the room.

DESCRIPTION OF EMBODIMENTS OF THE INVENTION

RFH—TUBING UNDER THE SUB-FLOOR

First Embodiment

Figure 1:
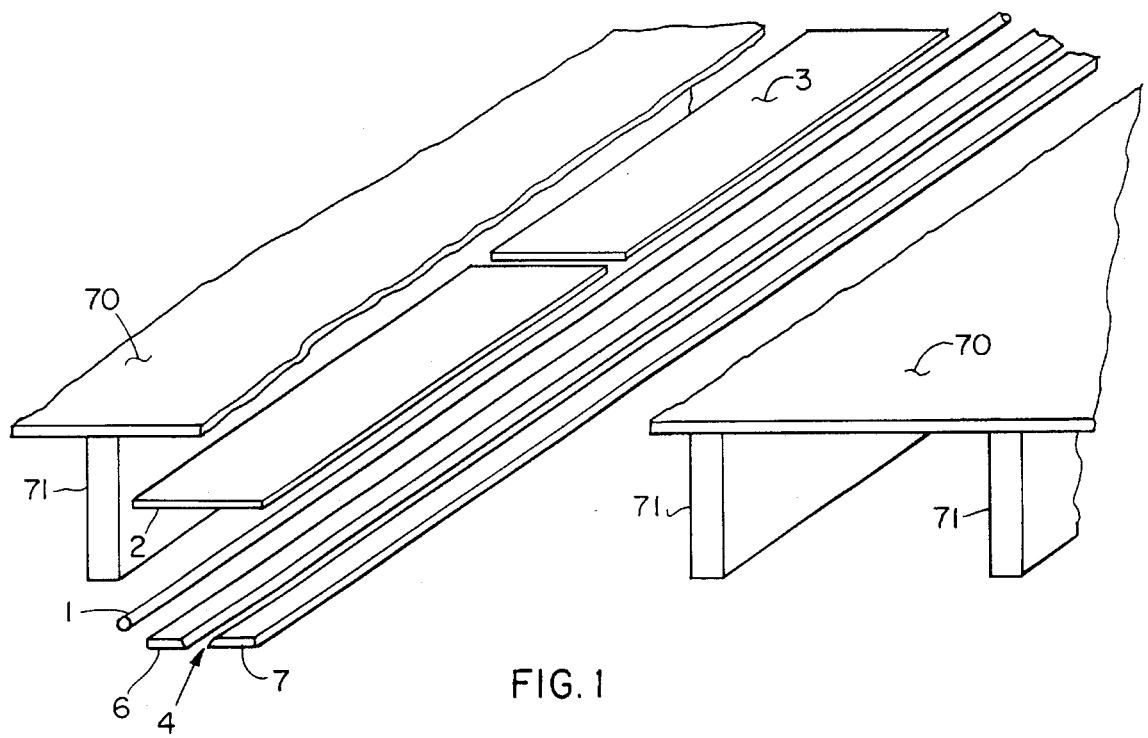
FIG. 1 is a diagram of an RFH installation showing the first embodiment in an exploded view revealing the tubing, heat conduction and radiation plates that are in intimate thermal contact with the tubing and holding pieces (wood strapping) that holds the assembly of tubing and radiation plates against the under side of the rough flooring that is on top of the floor joists of a room in a typical wood frame building.

FIG. 1 is a diagram of an RFH installation showing the first embodiment of the invention herein in an exploded view. The hydronic heating system tubing 1 is part of a heating loop of the system and, in particular, part of an RFH heating loop of the system. The hydronic heating system (not shown) preferably has supply water temperature control, such as described in the above mentioned pending U.S. patent application Ser. No. 545,399. The tubing is held against several lengths of heat conduction and radiation plates, such as 2 and 3. It is held between holding pieces 6 and 7, herein called sleepers, that may be wood strapping, so that the entire length of the tubing intended to give off heat to the floor is in intimate thermal contact with the plates, end to end, along the length of the tubing.

Figure 2:
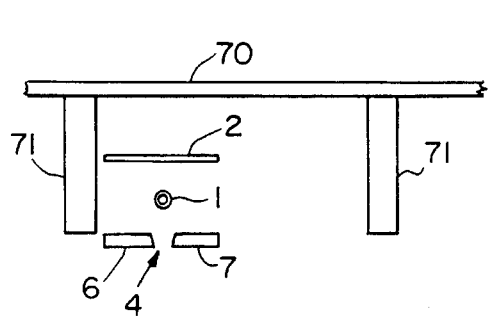
FIG. 2 is an end view of the parts shown in FIG. 1 and is also an exploded view of the parts.
Figure 3:
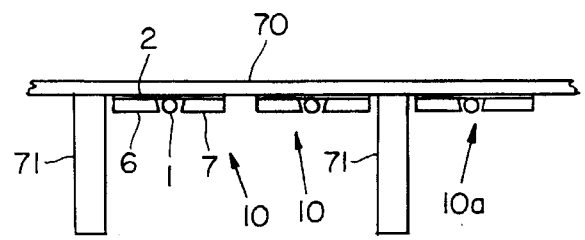
FIG. 3 is an end view of the parts shown in FIG. 1 showing the parts installed.

To mount the assembly of plates, holding pieces (sleepers) and tubing to the underside of the sub-flooring, as shown in FIGS. 2 and 3, the tubing is held against the plates, which are held firmly against the underside of the sub-flooring 70 of a room, the sub-flooring being supported by floor joists, such as floor joist 71. The plates 2 and 3 may be stapled, nailed or otherwise firmly attached to the underside of the sub-flooring. Then the tubing is mounted against the plates so that the tubing and the plates are in intimate thermal contact. This is done as described herein using a compliant thermally conductive filler material (denoted 20 or 40), which may be a particular caulking epoxy as described with reference to FIGS. 6 and 16 to 20. Holding pieces 6 and 7 hold the plate against the underside of the sub-flooring and the tubing is sandwiched between the holding pieces in space 4. The holding pieces may be wood strapping and the entire assembly 10 of tubing 1, plates 2 and 3 and strapping pieces 6 and 7 are stapled or nailed through the strapping and plates to the bottom of the subflooring.

Second Embodiment

Figure 6:
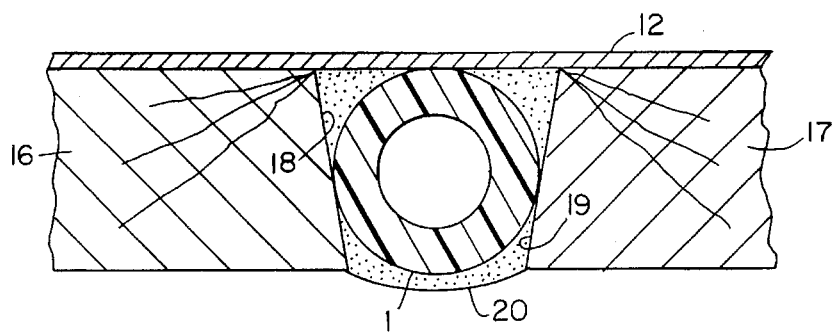
FIG. 6 is a much enlarged end view of the modular piece of the first embodiment showing a complaint the assembly of tubing, heat transfer plate and holder; and showing caulking or epoxy adhering the tubing against the plate in intimate thermal contact between the holder pieces.
Figure 7:
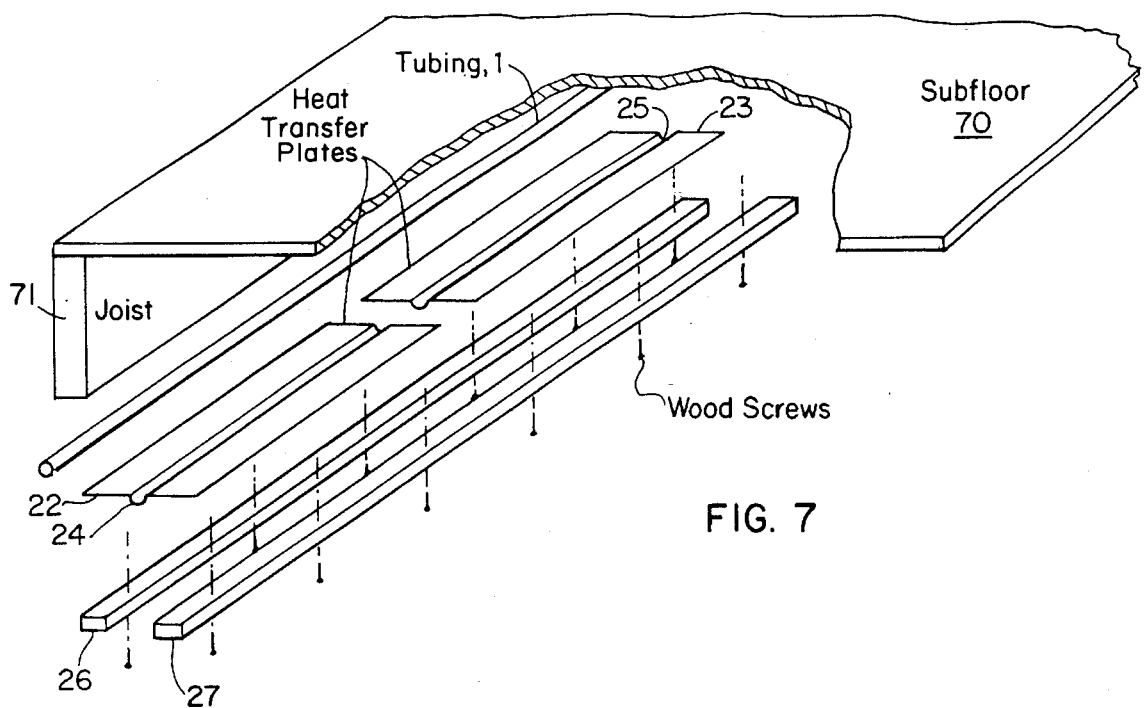
FIG. 7 is a diagram of an RFH installation showing the second embodiment in an exploded view revealing the tubing, heat conduction and radiation plates that are in intimate thermal contact with the tubing and holding pieces, similar to the view of the first embodiment shown in FIG. 1.
Figure 8:
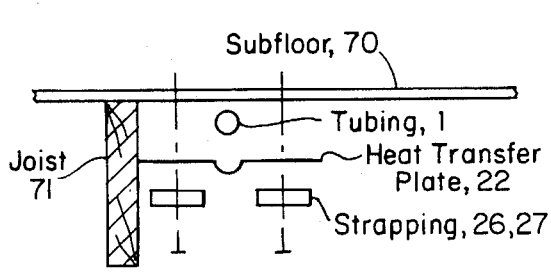
FIG. 8 is an end view of the parts of the second embodiment shown in FIG. 7 and is also an exploded view of the parts.
Figure 9:
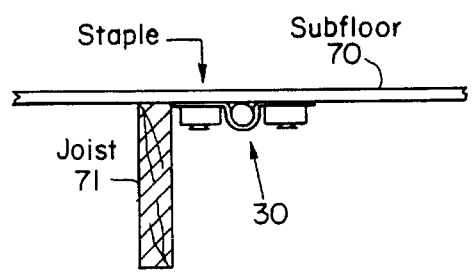
FIG. 9 is an end view of the parts of the second embodiment shown in FIG. 7 showing the parts installed.

FIGS. 7, 8 and 9 show the second embodiment in diagrams similar to FIGS. 1, 2 and 3, respectively. Here, the tubing 21 is between the sub-flooring and the plates 22 and 23 and is inserted into accomodating slots 24 and 25 in those plates so that the entire length of the tubing intended to give off heat to the floor is inserted in the slots, end to end along the length of the tubing. The shape of the slots and the size of the tubing are such that the tubing is in intimate thermal contact with the plates. This is done as described herein using a compliant filler material (denoted 20 or 40), which may be a particular caulking epoxy as described with reference to FIGS. 6 and 16 to 20.

At mounting, as shown in FIGS. 8 and 9, the tubing, held by the plates, is held firmly against the underside of the sub-flooring (rough flooring) 70 of a room, the sub-flooring being supported by floor joists, such as floor joist 71. The plates 22 and 23 may be stapled, nailed or otherwise firmly attached to the underside of the sub-flooring so that the tubing and the plates are in intimate thermal contact with the underside of the sub-flooring. Holding pieces 26 and 27 may be wood strapping and the entire assembly 30 of tubing 1, plates 22 and 23 and strapping pieces 26 and 27 may be stapled or nailed through the strapping and plates to the bottom of the subflooring.

Installation Procedure

Figure 10:
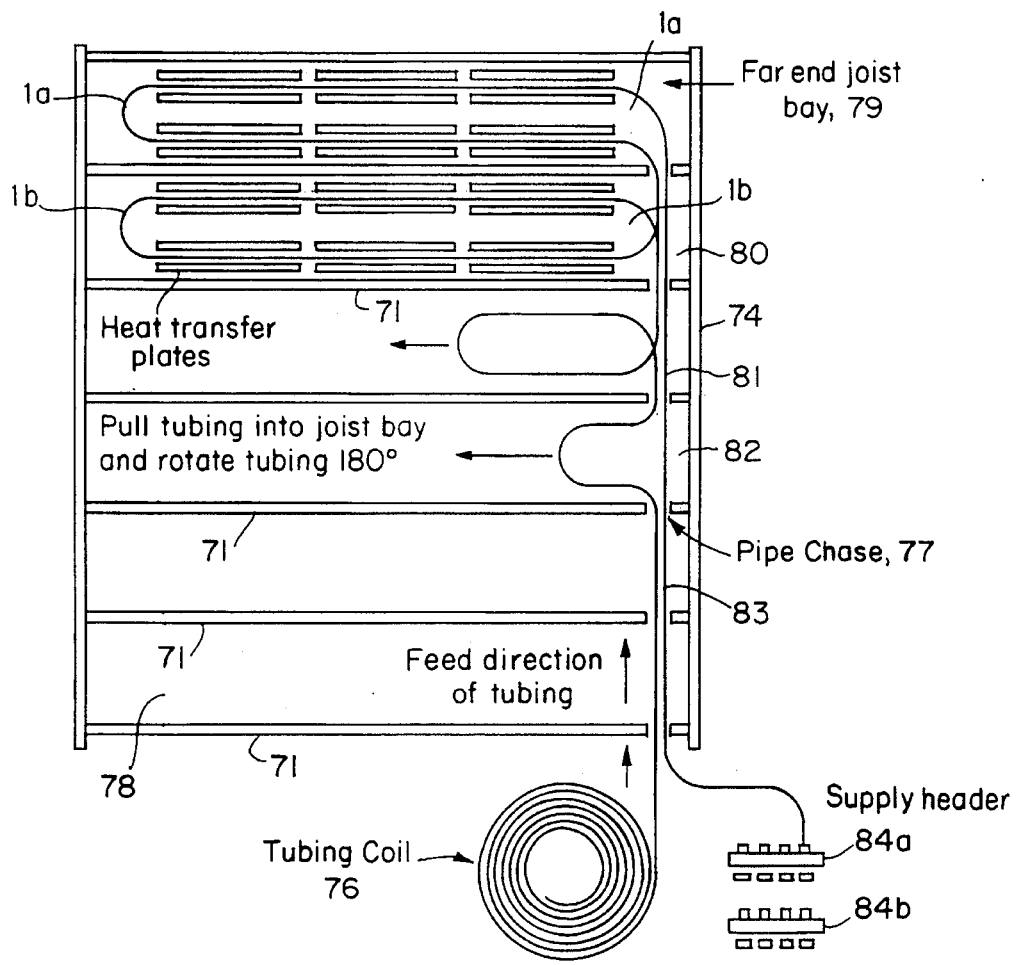
FIG. 10 is a top view of the RFH showing the floor joists with the rough flooring removed and shows the positions of the parts of either embodiment and illustrates a technique of feeding the tubing from one end of the floor through chases in the floor joists to one after another of the spaces between floor joists.
Figure 11:
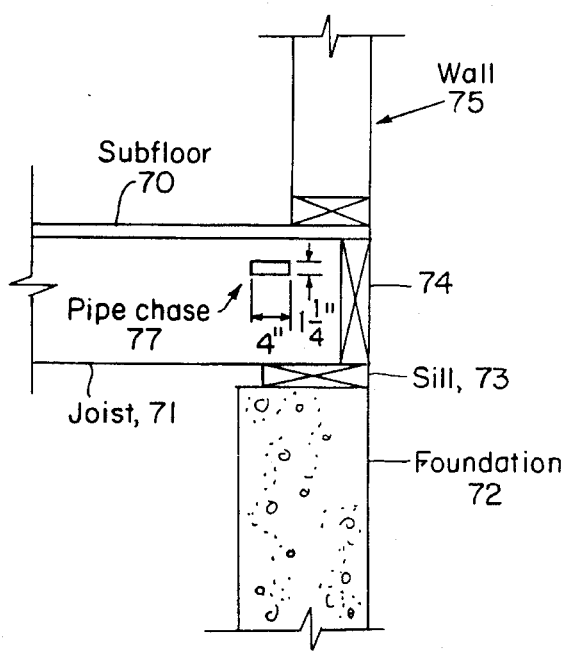
FIG. 11 shows a typical wood frame construction on a concrete foundation including floor joist, rough flooring, wall plate and wall stud as an aid to understanding structures of the present invention.
Figure 12:
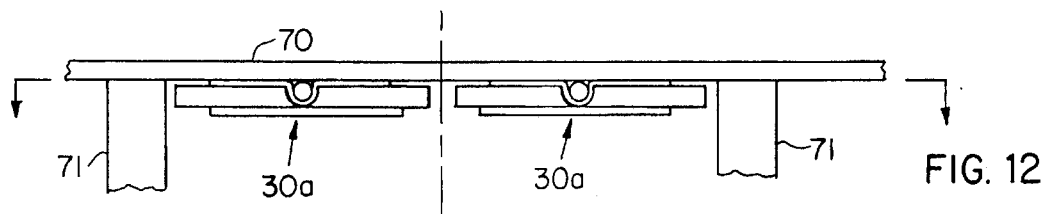
FIGS. 12 and 13 are enlarged end and top views, respectively, of an RFH installation of the first embodiment under the rough flooring showing the assembly of tubing, heat transfer plate and plate holder, the top view being taken below the rough flooring.
Figure 13:
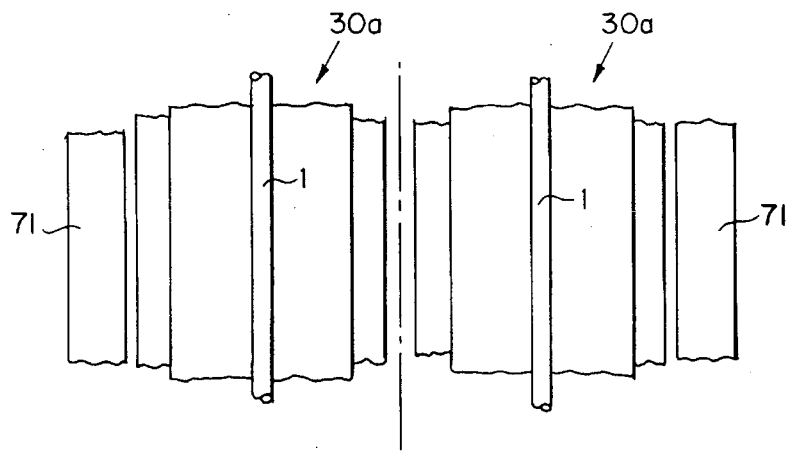

Typical wood frame construction as done widely throughout the U.S. is shown in FIGS. 1 to 3 and 7 to 11 and in other figures in this application. As shown in FIG. 11, the wood frame is erected on a concrete foundation 72 and includes a sill 73 on which the floor joists 71 rest, usually spaced sixteen inches on center. The outside ends of the joists are covered by outside plate 74 and the sub-flooring that is usually one inch boards or a heavy grade of plywood is nailed on top of the joists and end plate. The walls such as outside wall 75 is erected on top of the sub-flooring.

Installation of each radiant heating assembly of the second embodiment of tubing, plates and strapping to the underside of the sub-flooring may proceed as follows:

(a) Space the plates end to end along the tubing ¼" apart;

(b) Cut strapping pieces 26 and 27 to exact length of the several plates 22 and 23, end to end along the tubing 1;

(c) Sandwich tubing and heat transfer plates tightly between strappings and the subflooring.

(d) Insert compliant filler material 40 in the plates' grooves 24 and 25 and then force the plates onto the tubing so that the tubing snaps into the plates grooves and the filler 40 fills any space between the tubing and the plates;

(e) Staple one side of each plate to the sub-flooring while pushing it tightly against side of the adjacent floor joist;

(f) Push the plates with the strapping firmly against the tubing; and (g) Fasten the strapping 26 and 27 over the plates by nailing, stapling or with screws into the underside of the sub-flooring.

Before installation of each assembly of tubing, plates and strapping to the underside of the sub-flooring between adjacent floor joists (in adjacent floor joist bays), the tubing is pulled from a coil 76 of the tubing as illustrated in FIG. 10. The procedure is as follows:

(1) Pull the outside end of the tubing from the coil 76 and insert it through one after another pipe chase holes 77 in the floor joists from the near joist bay 78 to the far joist bay 79;

(2) Form a loop la of the tubing in the far bay 79 and insert the end of the tubing back through the chase holes 77 and pull the end from the chase hole that leads into the near bay 78, all of the way to the hydronic heating system supply header 77 and connect it to the a loop fitting thereof;

(3) Pull tubing loop la from the coil 76 and assemble each length of that loop with the plates, like 22 and 23, and the strapping, like 26 and 27, to the underside of the sub-flooring;

(4) Pull the next loop 1b from coil 76 into the next bay 30 and assemble each length of that loop with the plates, like 22 and 23, and the strapping, like 26 and 27, to the underside of the sub-flooring;

(5) Continue this procedure in bay after bay to and including the near bay 78;

(6) Then, either pull the tubing off of the coil to the next floor of the hydronic heating system RFH loop and repeat this procedure, or, if the floor completed is the last or only floor of the loop, pull the tubing to the hydronic heating system return header 84 and connect it to the loop fitting thereof to complete the installation; and (7) Then insulate each bay with six inches or more of fiber glass mat between the joists.

TUBE HOLDING MODULAR PIECES

First Embodiment

Figure 4:
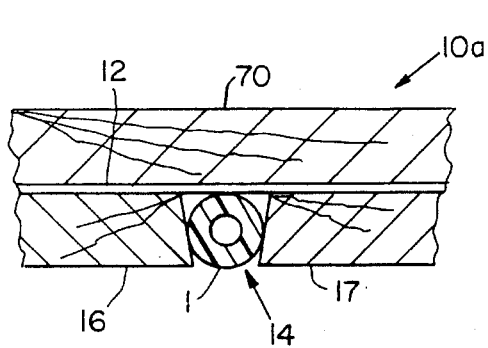
FIG. 4 is a further enlarged end view showing the assembly of tubing, heat transfer plate and holders.
Figure 5:
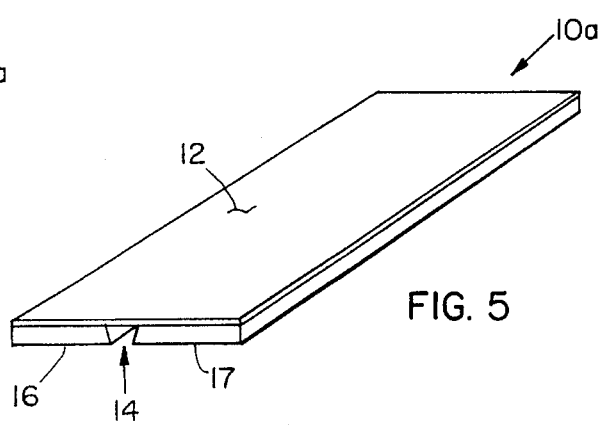
FIG. 5 is a perspective view of the assebly of heat transfer plate and holder of the first embodiment providing a modular piece or modular unit of modular size.

A configurations of a module piece, which is an assembly of a heating plate, like plates 2 and 3, and pieces that serve the functions of the strapping pieces 6 and 7 in FIGS. 1 to 3, are shown in FIGS. 4 to 6. A typical modular piece of this first embodiment, denoted 10a, is shown in FIG. 5. It is composed of two lengths 16 and 17 of plywood, particle board or other rigid material, about the same thickness as the outside diameter of the tubing it is assembled with. The two lengths 16 and 17 of holder pieces (herein called sleepers) hold the heat conduction and radiation plate 12 against the underside of sub-flooring 70 and provide a tubing containment space 14, the length thereof for holding the tubing 1 against the plate.

As shown in FIG. 4, the tubing containment space 14 is the space between sleeper pieces 16 and 17 and is closed on one end (the top end in this Figure) by the plate and so the tubing must be inserted into this space from the other end of the space (the bottom end in this Figure). Thus, the open end of the tubing containment space 14 is separated from the sub-flooring by the plate whether mounting is to the underside of the sub-flooring, as shown in FIGS. 1 to 4, or to the top side of the sub-flooring in essentially the same manner as shown and described with reference to FIGS. 21 and 22. When this first embodiment is mounted to the top side of the sub-flooring, the plate is still between the sub-flooring and the tubing.

The plate is made of highly thermally conductive material such as aluminum, copper or steel. For example, it can be made of a relatively thin sheet of 0.008 guage, 3003 alloy aluminum; and is attached to sleepers 16 and 17 by a suitable glue or epoxy. Plate 12 can also be made of heavier thermally conductive material so that it conducts heat from the tubing more readily.

For installations in wood frame construction where the spacing between floor joists and between wall studs is 16 inches on center, the modular piece size is made in consideration of that usual joist and stud spacing. For example, for the under floor installation shown in FIGS. 1 to 3, two modular pieces must fit side by side in a bay between floor joists and the bay width is about 14½ inches. Therefore, the preferred width of the module piece is less than half of that, or between 6 and 7 inches. The length of the modular piece is preferably a whole multiple of 16 inches and preferably 32 or 48 inches.

The inside edges of the sleeper pieces define the space 14 into which the tubing is inserted and held against the plate. Those edges 18 and 19 are preferably beveled as shown in FIG. 6. The purpose of the bevel is to taper the space 14 so that it becomes wider toward the plate. Thus, the tubing must be forced into the space from the open side thereof and once forced into the space is held firmly therein against plate 12. The tubing is further held securely in space 14 in intimate thermal contact with the plate by a compliant filler (epoxy) material 20, according to the present invention as is described further hereinbelow.

Second Embodiment

Figure 14:
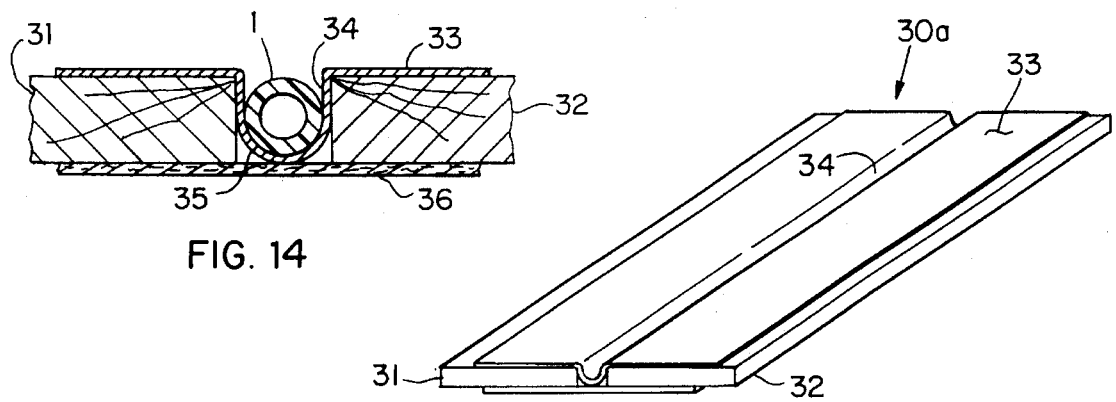
FIG. 14 is a further enlarged end view of the second embodiment showing the assembly of tubing, heat transfer plate and holder.
Figure 15:
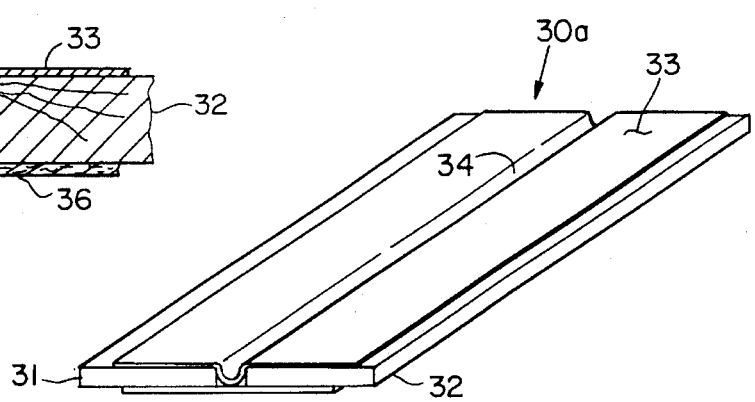
FIG. 15 is a perspective view of the assembly of heat transfer plate and holder of the second embodiment forming a modular piece in a modular size.

Several configurations of a modular piece of the second embodiment, which is an assembly of a heating plate, like plates 22 and 23, and holding pieces that serve the functions of the strapping pieces 26 and 27 in FIGS. 7 to 9, are shown in FIGS. 12 to 20. A typical modular piece 30a of this second embodiment is shown in FIG. 15. It is composed of two lengths 31 and 32 of plywood, particle board or other rigid material, about the same thickness as the outside diameter of the tubing it is to be installed with. The two lengths 31 and 32 (herein also called sleepers) support the heat conduction and radiation plate 33, which has a longitudinal slot 34 the length thereof that fits snuggly (or snaps) around the RFH loop tubing at the installation.

As shown in FIG. 14, the plate slot 34 fits between sleeper pieces 31 and 32 and defines a loop 35, which is as long as the thickness of the sleeper pieces and into which the tubing 1 fits at installation. The plate is made of highly thermally conductive material such as aluminum, copper or steel. For example, it can be made of a sheet as thin as 0.008 guage, 3003 alloy aluminum; and is attached to sleepers 31 and 32 by a suitable glue or epoxy. The slot 34 formed in such sheet aluminum can be easily distorted as the spacing between the two sleepers varies. To avoid this, a piece of reinforcing mat 36 is attached to both sleeper pieces, bridging the space and so insuring a degree of lateral dimensional stability of the module piece parts. The mat 36 may be fiber glass reinforced flexible material that is attached by glue or epoxy to the sleeper pieces as shown. The completed modular piece 30a, shown in FIG. 15 is substantially rigid longitudinally and can flex slightly along the slot 34.

Plate 33 can also be made of heavier thermally conductive material so that it conducts heat from the tubing more readily. However, it is useful that the slot 34 loop 35 be continuous with the rest of the plate and if the plate material is relatively heavy, it will likely be more rigid and so the modular piece 30a will not be so flexible along the slot thereof.

For installations in wood frame construction where the spacing between floor joists and between wall studs is 16 inches on center, the modular piece size is made in consideration of that usual joist and stud spacing. For example, for the under floor installation shown in FIGS. 7 to 13, two modular pieces must fit side by side in a bay between floor joists and the bay width is about 14½ inches. Therefore, the preferred width of the modular piece 30a is less than half of that, or between 6 and 7 inches. The length of the modular piece is preferably a whole multiple of 16 inches and preferably 32 or 48 inches.

Figure 16:
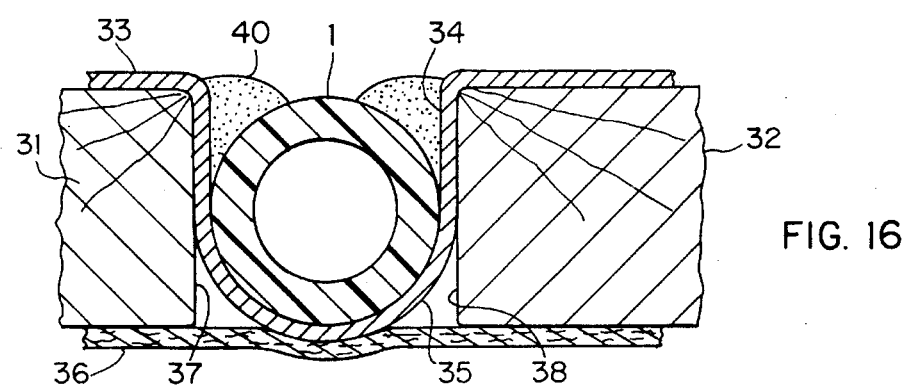
FIG. 16 is a much enlarged end view of the assembly of tubing, heat transfer plate and holder of the second embodiment, showing a compliant thermally conductive filler material, such as caulking or epoxy adhering the tubing in a recess in the heat transfer plate in intimate thermal contact therewith.
Figure 17:
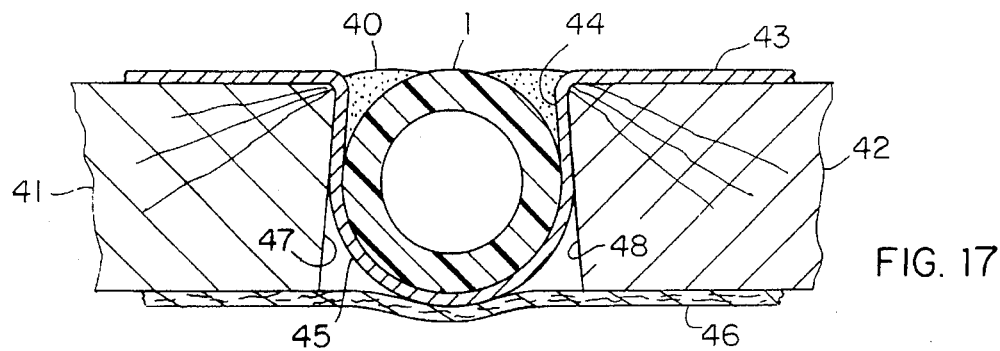
FIGS. 17 to 19 show variations of the same structure revealed in FIG. 16 with straight or tapered walls defining the recess in the heat transfer plate that accomodates the tubing, all including a compliant thermally conductive filler material around the tubing providing intimate thermal contact with the plate.

The inside edges of the sleeper pieces define the space into which the slot in the plate fits. Those edges 47 and 48 may be parallel to each other and perpendicular to the plane of the modular piece as shown in FIGS. 14 and 16; or they may be beveled as shown in FIG. 17. The purpose of the bevel is to shape the slot in the plate by tapering it so that it is slightly more narrow at the open end (the top as shown in FIGS. 12 to 20) where the tubing enters it and widens slightly toward the bottom thereof where the tubing is contained. For example, in FIG. 17 the sleepers 34 and 42 inside edges 47 and 48 are beveled so that they define a tapered opening into which the slot 44 of the plate 43 projects. Since the sleepers shape the slot, the slot tapers from its entrance to its bottom and the reinforcing mat 46 fixes the width of the slot at the top when the sleepers are co-planar and that width is fixed to be slightly less than the outside diameter of the tubing 1. As a result, the tubing must be forced into the slot; and once forced, in remains firmly held so long as the two sleepers are co-planar. The tubing can be released easily by simply flexing the module at the slot so that the sleepers are not co-planar and the top of the slot is wider than the bottom.

Second Embodiment Modular Piece Slot Configurations

Figure 18:
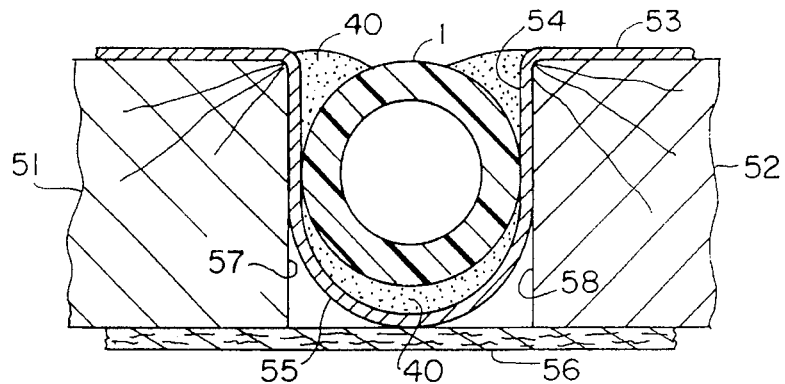
Figure 19:
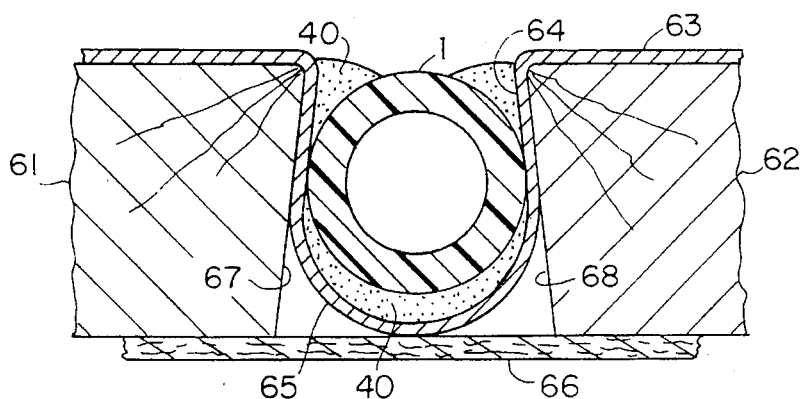

FIGS. 17 to 19 show variations of the same structure revealed in FIG. 16 with straight or tapered walls defining the slot in the heat transfer plate that accomodates the tubing. FIG. 18 shows perpendicular sleeper walls 57 and 58 and the thickness of the sleepers is significantly greater than the tubing outside diameter, so that the plate loop 55 in slot 54 is deeper and the tubing is sure to be positioned in the slot with the top of the tubing below the top of the plate.

FIG. 19 shows a configuration that combines the tapered groove of FIG. 17 with the deeper slot of FIG. 18. Here, the taper tends to hold the tubing at the bottom of the loop 65 so that the top of the tubing is sure to be below the top of the plate.

Filler Around Tubing in First and Second Embodiments

According to the present invention, a compliant filler and holding material around the tubing held in the space 14 in the first embodiment shown in FIGS. 1 to 6 and denoted material 20, and around the tubing in the second embodiment shown in FIGS. 12 to 20 and denoted 40, is applied to the space and/or tubing and is applied to the slot and/or the tubing before the tubing is inserted or forced into the space or slot. A purpose of the filler material is to hold the tubing in the space/slot as an adhesive, while at the same time allowing the tubing to expand and contract longitudinally within the spaces/slots of successive modular pieces that hold a length of tubing at installation. The tubing must be free to expand and contract, while the plates are fixed by staples, nails, screws, etc. to the subflooring. Another purpose of the filler material is to reduce noise created by expansions and contractions of the tubing in the spaces/slots. Yet another purpose is to provide a medium of thermal conduction from the tubing to the plate; and for that purpose it is important that the filler 40 fill all voids between the tubing and the space/loop of the plate in the slot that contains the tubing. A suitable filler material for any of these purposes is silicone rubber.

A convenient form of silicone rubber that can be used in the installations described herein and shown in FIGS. 1 to 20 is available commercially as a sealant or a caulking in viscous liquid form, usually dispensed from a tube by simply forcing it out of a nozzle on the tube. Such a sealant/caulking is usually a prepared mix of silicone dioxide, methanol and ammonia. A commercial source of this sealant/caulking mix is a General Electric product called SILICONE II that remains resilient for many years after it is applied.

Figure 20:
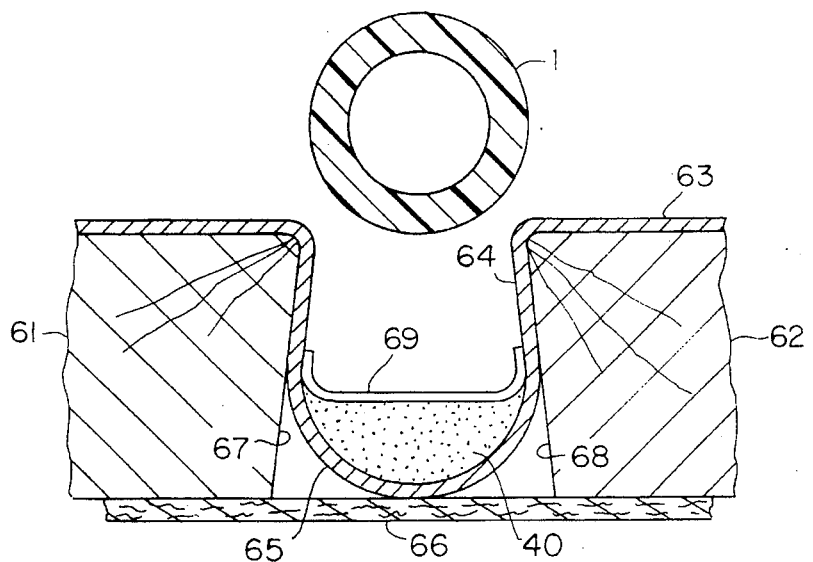
FIG. 20 shows a variation of the same structure revealed in FIG. 16 with tapered walls defining the recess in the heat transfer plate that accomodates the tubing, compliant thermally conductive filler material, such as caulking or epoxy in the recess covered by a peel-off strip and the tubing positioned for insertion into the recess after the peel-off strip is removed.

FIG. 20 shows the same configuration of sleepers 61 and 62, plate 63 and reinforcing web 66 as shown in FIG. 19, (a configuration of the second embodiment), but with the tubing 1 removed from the slot 64 and poised for insertion into the slot. The resilient filler 40 can be applied to the slot just before the tubing is inserted, or it can be stored in the slot at the bottom of loop 65 thereof and as such, be included with the modular piece such as 30a shown in FIG. 15. In that case, it is recommended that the filler be protected during storage by, for example covering it with a peel off seal, such as seal 69.

RFH-TUBING ON TOP OF SUB-FLOORING

The tubing can be mounted on top of the sub-floor using modular pieces similar to the first embodiment modular piece 10a, shown in FIG. 5 or the second embodiment modular piece 30a shown in FIG. 15. FIG. 21 is an enlarged end view of an RFH installation on top of the sub-flooring, 70, showing several modular pieces of the second embodiment, each an assembly of two sleepers, a heat transfer plate and reinforcing web, the modular units being arranged side by side and end to end on the sub-flooring, on an area thereof in a room.

FIG. 22 is a perspective view of the same room. showing several of the second embodiment modular units of different kinds, arranged side by side and end to end on the sub-flooring 70 of the room over an area of the floor defined by vertical corner lines 85a to 85c. The modular pieces hold tubing 1 as a continuous length laid down serpentine fashion from piece to piece, embedded in the slots of the modular pieces and held securely therein by the slot structure itself and the filler material 40 therein.

CONCLUSIONS

While the invention described herein is described in connection with several preferred embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

I claim:

1. In a hydronic heating system having a source of hot supply water and a reservoir of cooler return water, a supply water line from said source, a return water line to said reservoir and one or more heating loops through which water flows from said supply line to said return line, said heating loop including a heating element that is a length of tubing that conducts water from said supply line to said return line and said length of tubing is mounted in a wall or a floor of an area heated by said system by RFH or RWH, respectively, in said area, the improvement comprising:

(a) a relatively highly thermally conductive plate having a radiating surface mounted in said area floor or wall, adjacent a surface thereof, (b) a plate support of relatively low thermal conductivity material providing an elongated space for holding said length of tubing adjacent said plate and (c) a compliant filler of relatively higher thermal conductivity material that fills around said tubing between said tubing and said plate, (d) whereby said plate is heated by conduction of heat from said tubing and (e) said plate radiating surface radiates heat to said area.

2. A hydronic heating system as in claim 1 wherein:

(a) said plate has length, width and thickness and said length and width define said radiating surface of said plate, (b) said plate is mounted in said floor or wall oriented with said radiating surface thereof parallel to said floor or wall surface adjacent thereto.

3. A hydronic heating system as in claim 2 wherein:

(a) said plate support for holding said length of tubing adjacent said plate, holds said tubing on the opposite side of said plate from said adjacent floor or wall surface.

4. A hydronic heating system as in claim 3 wherein:

(a) said compliant filler material fills around said tubing between said tubing and said plate and between said tubing and said plate support.

5. A hydronic heating system as in claim 4 wherein:

(a) said plate support includes two spaced apart elongated plate support pieces, (b) said elongated space is the space between said two spaced apart elongated plate support pieces, (c) said elongated space has a side that is closed by said plate and a side opposite thereto that is open and (d) said compliant filler material is inserted into said elongated space and then said length of tubing is inserted into said elongated space through said open side thereof, forcing said fill material to fill around said tubing between said tubing and said plate.

6. A hydronic heating system as in claim 1 wherein:

(a) there is a slot in said plate in which said length of tubing fits, (b) said slot is formed of highly thermally conductive material in intimate thermal contact with said plate, (c) said slot fits in said plate support elongated space and (d) said compliant filler material fills between said tubing and said slot.

7. A hydronic heating system as in claim 6 wherein:

(a) said plate and said slot are formed of the same material.

8. A hydronic heating system as in claim 6 wherein:

(a) said plate material is aluminum.

9. A hydronic heating system as in claim 6 wherein:

(a) said plate and said slot are formed as a continuous sheet of metal.

10. In a hydronic heating system having a source of hot supply water and a reservoir of cooler return water, a supply water line from said source, a return water line to said reservoir and one or more heating loops through which water flows from said supply line to said return line, said heating loop including a heating element that is a length of tubing that conducts water from said supply line to said return line and said length of tubing is mounted in a wall or a floor of an area heated by said system by RFH or RWH, respectively, in said area, the improvement comprising:

(a) a relatively highly thermally conductive plate mounted in said area floor or wall, adjacent a surface thereof, (b) a plate support providing an elongated space for holding said length of tubing adjacent said plate and (c) a compliant filler that fills around said tubing between said tubing in said elongated space and said plate, (d) whereby said tubing is held firmly against said plate, said plate is heated by conduction of heat from said tubing and said plate radiates heat to said area and (e) the compliance of said compliant filler allowing some movement of said tubing in said elongated space.

11. A hydronic heating system as in claim 10 wherein:

(a) said plate support is rigid and dimentionaly stable and (b) said compliant filler is pliable and distorts under force.

12. A hydronic heating system as in claim 10 wherein:

(a) said plate support is relatively thermally insulating and (b) said compliant filler is relatively thermally conducting.

13. A hydronic heating system as in claim 10 wherein:

(a) said plate support includes two spaced apart elongated plate support pieces, (b) said elongated space is the space between said two spaced apart elongated plate support pieces, (c) said elongated space has a side that is closed by said plate and a side opposite thereto that is open and (d) said compliant filler material is inserted into said elongated space and then said length of tubing is inserted into said elongated space through said open side thereof, forcing said fill material to fill around said tubing between said tubing and said plate.

14. In a hydronic heating system having a source of hot supply water and a reservoir of cooler return water, a supply water line from said source, a return water line to said reservoir and one or more heating loops through which water flows from said supply line to said return line, said heating loop including a heating element that is a length of tubing that conducts water from said supply line to said return line and said length of tubing is mounted in a wall or a floor of an area heated by said system by RFH or RWH, respectively, in said area, the improvement comprising:

(a) a relatively highly thermally conductive plate mounted in said area floor or wall, adjacent a surface thereof, (b) a plate support of relatively low thermal conductivity providing an elongated space for holding said length of tubing adjacent said plate and (c) a compliant filler of relatively higher thermal conductivity that fills around said tubing between said tubing in said elongated space and said plate and provides intimate thermal conductivity between said tubing and said plate, (d) whereby said tubing is held firmly against said plate, said plate is heated by conduction of heat from said tubing and said plate radiates heat to said area and (e) the compliance of said compliant filler allowing some movement of said tubing in said elongated space.

15. A hydronic heating system as in claim 14 wherein:
(a) said plate support is rigid and dimentionaly stable and
(b) said compliant filler is pliable and distorts under force.

16. A hydronic heating system as in claim 14 wherein:
(a) said plate support includes two spaced apart elongated plate support pieces,
(b) said elongated space is the space between said two spaced apart elongated plate support pieces,
(c) said elongated space has a side that is closed by said plate and a side opposite thereto that is open and
(d) said compliant filler material is inserted into said elongated space and then said length of tubing is inserted into said elongated space through said open side thereof, forcing said fill material to fill around said tubing between said tubing and said plate.

* * * * *